UNITED STATES PATENT OFFICE.

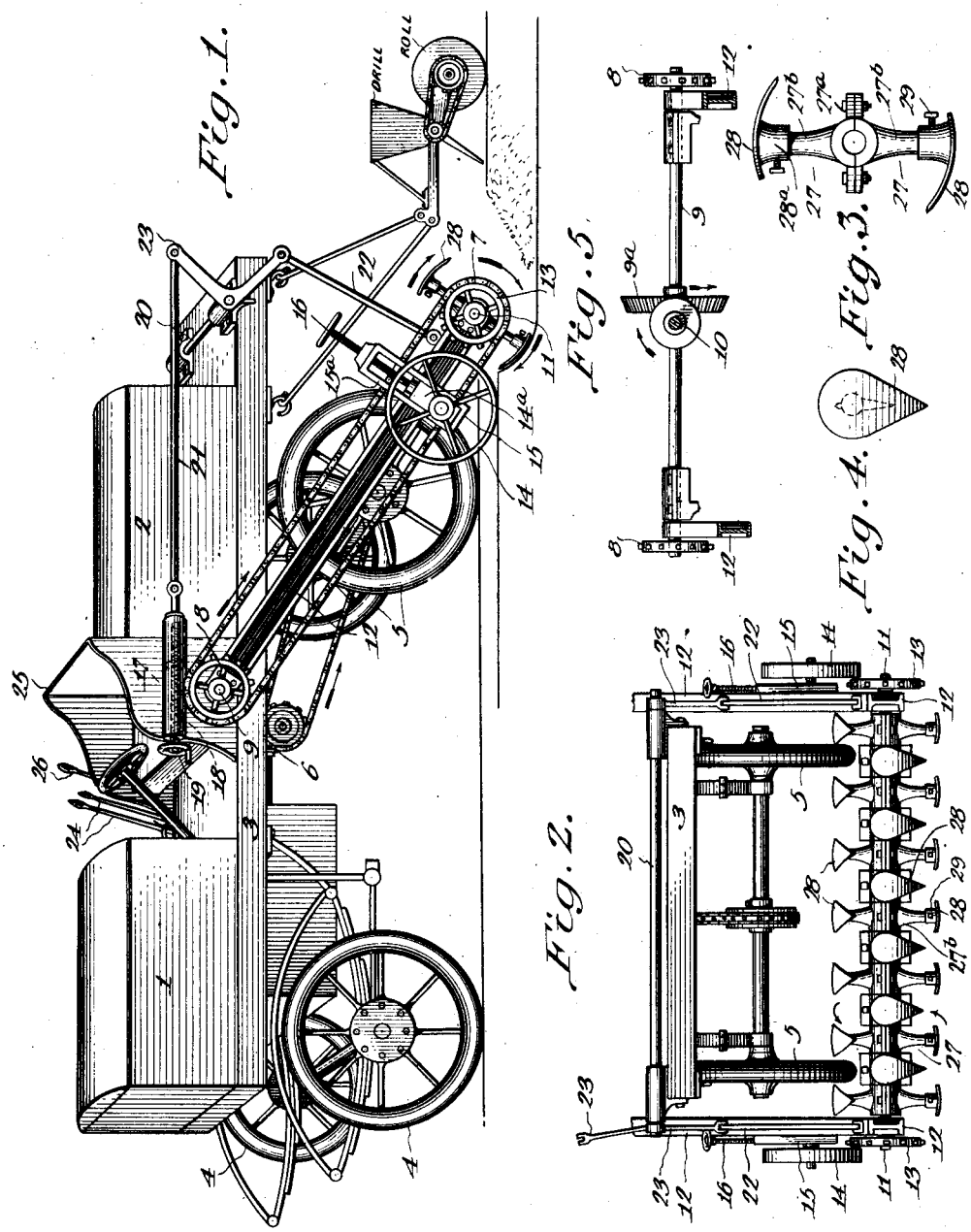

HEINRICH F. D. SCHWAHN, OF BELLEVILLE, ILLINOIS, ASSIGNOR TO WILLIAM SOMERVILLE, OF ST. LOUIS, MISSOURI.

MOTOR-DRIVEN ROTARY EARTHWORKING-TOOL.

1,076,241. Specification of Letters Patent. Patented Oct. 21, 1913.

Application filed October 30, 1909. Serial No. 525,595.

*To all whom it may concern:*

Be it known that I, HEINRICH F. D. SCHWAHN, a citizen of the United States, residing in the city of Belleville, in the county of St. Clair and State of Illinois, have invented certain new and useful Improvements in Motor-Driven Rotary Earthworking-Tools, of which the following is a specification.

My invention relates to agricultural implements of the motor driven type and comprises a motor propelled vehicle carrying and operating rotary soil working devices arranged to operate on the soil from below upwardly in the direction of movement of the vehicle, and provided with means for adjusting the depth of cut of said soil working devices and for raising the same from and lowering the same to operative position.

My invention, in its preferred embodiment, is shown in the accompanying drawing, in which—

Figure 1 is a view in side elevation of my device as assembled, a seed drill and roller being shown in connection with the soil working devices. Fig. 2 is a rear elevation of the device, the seed drill and roller being removed. Fig. 3 is an enlarged sectional view of one of the soil working members. Fig. 4 is a top plan view of the blade of said member. Fig. 5 is a sectional view through the body of the vehicle showing, in elevation, the gearing by which the soil working devices are actuated.

Referring to the drawings by numerals: the motor propelled vehicle comprises the usual platform 3 upon the front and rear ends of which I preferably mount motors of any desirable type, their location being indicated by the numerals 1 and 2 respectively. The body of the vehicle is supported by the usual front steering wheels 4 and the rear driving wheels 5 connected with the motor 1 by chain gearing as 6. The vehicle is of course provided with starting and reversing levers as 24 and 26, located adjacent the seat 25, and with steering means as shown.

Mounted in bearings on the vehicle body is a shaft 9 carrying a gear $9^a$ intermediate its ends with which a gear 10, actuated from the motor 2, engages. The ends of the shaft 9 preferably extend out beyond the platform 3 of the vehicle and are provided at their ends with sprocket wheels 8. On the shaft 9 between these sprocket wheels and the platform 3 and at each side of the vehicle are journaled the upper ends of arms 12 preferably shaped as I beams, which incline downwardly and rearwardly therefrom. These arms are supported forward of their rear and lower ends by ground wheels 14 in the following manner. As these supporting means are identical with each arm and ground wheel, a description of one will be sufficient.

Each ground wheel 14 is provided with a short axle which is journaled in a block $14^a$ slidable in guide ways $15^a$ formed by the sides of a boxing 15 secured to the arm 12. Extending upwardly from this block is a threaded spindle 16 provided with a hand operating wheel and extending through a corresponding threaded aperture in the end of the boxing 15. By operating this hand wheel the block may be moved along the guide ways to any desired position, thus moving the ground wheel 14 relative to the arm 12, and furnishing means for varying the angle of inclination of said arm relative to the ground and for varying the depth of cut of the soil working devices which are preferably secured between the lower ends of both of said arms as will be described. Connecting the lower ends of the arms 12 is a shaft 11 which extends out beyond said arms on each side and has mounted on its ends, sprocket wheels 13 in line with the sprocket wheels 8 and operatively connected therewith by the sprocket chains as shown. Mounted on this shaft 11 between the two arms 12 are suitable means for operating upon the soil, such means consisting preferably of a plurality of cutting units, each unit comprising complemental tool holding sections 27 provided with semi-circular flanged hubs $27^a$ adapted to be clamped together on the shaft 11 as shown, and with radial arms or spokes $27^b$ which fit into sockets in bosses $28^a$ formed on the space or other cutting tool 28, and are clamped thereto with the tool at any suitable angle by the set screws 29. The tools of each cutting unit are of course oppositely arranged to both face in the direction of rotation. The cutting units preferably have their tools in "staggered" relation to each other—*i. e.*, the corresponding tools of alternate units in substantially longitudinal alinement—so as to evenly distribute the "working" tools and minimize strain on the shaft and tools.

To enable the soil working members to be raised from operative position and held in such position, I suitably journal a transversely extending rock shaft 20 on the rear end of platform 3 and secure to one end of such shaft, a bell crank lever 23, one end of which is connected by a link 22 to one of the arms 12 adjacent its lower and rear end and the other end of which lever is connected by a link 21 with an actuating device preferably located adjacent the driver's seat. On the other end of the shaft is mounted a crank arm 23ª (Fig. 2) similarly connected by a link in the arm 12 on that side of the vehicle. This actuating device comprises a suitably supported threaded spindle 18 operating in an internally threaded sleeve 17 to one end of which the link 21 is suitably connected. A hand wheel 19 is provided for the outer end of the threaded spindle. It will be evident that by rotating the spindle 18, the sleeve 17, link 21 and bell crank lever 23 will be moved either forwardly or rearwardly, as desired, to raise or lower through link 22, the arms 12 and their attached soil working devices, as may be desired. In addition to raising and lowering the arms and cutting tools from the ground, the aforesaid means may be utilized as an additional means for regulating the depth of cut of the tools.

In operation, the arms 12 and the soil working tools are first carried raised out of operative position. The threaded spindles 16 are operated to adjust the arms 12 relative to the ground wheels 14 to regulate the depth of cut after which the motor is started to rotate the soil cutting tools. The arms 12 carrying such tools are then lowered by the means hereinbefore described until the ground wheels 14 reach the ground. The soil cutting blades will force themselves into the ground to the desired depth below the ground wheel, throwing the soil to the rear. The vehicle propelling motor is now started and the soil cutting tools are drawn forward with the vehicle, cutting against the soil from below upwardly in the direction of movement of the vehicle. When it is desired to propel the vehicle without operating on the ground, or to make a short turn quickly, the arms 12 with their attached cutting tools are merely raised from the ground by the means described. Additional soil working devices, such as the seed drill and roller, shown in Fig. 1 of the drawing, may be used in connection with the rotating soil cutting tools, but this forms no part of the present invention.

While I have illustrated a preferable embodiment of my device, it is obvious that many changes and adaptations are possible within the spirit of my invention.

What I claim, therefore, and desire to secure by Letters Patent is:—

1. In a device of the character described, the combination of a rotatable shaft and a plurality of ground tilling units mounted on said shaft and rotatable therewith, each unit comprising complemental semi-circular hub sections adapted to be clamped together about said shaft and provided with rigid radially extending spokes and cutting tools provided with sockets fitting over the ends of said spokes and detachably secured thereto.

2. In a device of the character described, the combination of a rotatable shaft and a plurality of ground tilling units mounted on said shaft and rotatable therewith, each unit comprising complemental semi-circular hub sections provided with lateral flanges by which they are secured together about said shaft, and having rigid radially extending spokes and cutting tools provided with socketed bosses fitting over the ends of said spokes and detachably secured thereto, adjacent units on said shaft being arranged with their cutting tools in staggered relation.

HEINRICH F. D. SCHWAHN.

Witnesses:
JESSE A. WOLFORT,
EWALD E. VICK.